United States Patent [19]

Ellery, Sr.

[11] Patent Number: 4,661,911

[45] Date of Patent: Apr. 28, 1987

[54] ADAPTIVE CONSTANT REFINER INTENSITY CONTROL

[75] Inventor: John M. Ellery, Sr., Pittsfield, Mass.

[73] Assignee: Beloit Corporation, Beloit, Wis.

[21] Appl. No.: 696,904

[22] Filed: Jan. 31, 1985

[51] Int. Cl.[4] ........................ G06F 15/46; B02C 7/14

[52] U.S. Cl. .................................... 364/471; 364/148; 364/162; 241/33; 241/36; 241/37; 162/254; 162/263

[58] Field of Search ........................ 364/148, 162, 471; 162/252, 254, 258, 263; 241/33, 36, 37

[56] References Cited

U.S. PATENT DOCUMENTS

| | | | |
|---|---|---|---|
| 3,604,646 | 9/1971 | Keyes, IV et al. | 241/37 |
| 3,610,541 | 10/1971 | Guday | 241/37 |
| 3,654,075 | 12/1972 | Keyes, IV et al. | 162/254 |
| 3,711,688 | 1/1973 | Stout et al. | 364/471 |
| 4,184,204 | 1/1980 | Flohr | 364/471 |
| 4,374,703 | 2/1983 | Lebeau et al. | 364/471 |
| 4,498,137 | 2/1985 | Flohr | 364/471 |
| 4,589,598 | 5/1986 | Ellery, Sr. | 364/471 |

OTHER PUBLICATIONS

"Paper Making Equipment Control", IBM Bulletin, vol. 12, No. 1, Jun. 1969.

*Primary Examiner*—Jerry Smith
*Assistant Examiner*—John R. Lastova
*Attorney, Agent, or Firm*—Dirk J. Veneman; Raymond W. Campbell; David J. Archer

[57] ABSTRACT

A method and an apparatus are provided for maintaining a constant refining intensity under varying tonnage rate and applied power conditions to a slurry of paper stock being passed through a disk type refiner. The system utilizes a control strategy and several unique control algorithms which combine to provide a result which relates the speed of rotation of the refiner elements to the power consumed by the drive motor. The present invention is based on intensity which is defined as the net refining power applied divided by the number of bar crossings (refining elements) per unit time. The system is an adaptive control system which operates on the basis of real time measurements of the refiner process.

20 Claims, 4 Drawing Figures

ADAPTIVE CONSTANT REFINER INTENSITY CONTROL

BACKGROUND OF THE INVENTION

1. Field of the Invention

The present invention relates to a refiner control and is more specifically concerned with an adaptive refiner control which operates with respect to real time process measurements and adjustable constants to provide a calculated main drive speed that is related to the energy drawn by the main drive of a refiner.

2. Description of the Prior Art

The basic problem faced by paper mills today with respect to refining is maintaining the refining intensity, which is a function of refining plate design and net energy applied to paper stock, constant for a given grade of paper at a varying rate of production and then, using the same refining equipment, producing another grade of paper at a different rate of production and a new set of horsepower day per ton and refining intensity values. Present techniques provide a constant speed of the main drive motors; therefore, for a change in production rates, an adjustment in refiner power is undertaken to obtain the required horsepower day per ton, but the refiner intensity remains virtually unchanged because the speed is unchanged.

Under the foregoing conditions, paper mill personnel must continue to adjust refiner power in an attempt to find the optimum refiner setting for the desired results. This setting often results in wasted energy.

SUMMARY OF THE INVENTION

It is the object of the invention to provide a refiner intensity control which is adaptive to the particular refiner requirements and process.

The above object is achieved through the provision of an adaptive constant refiner intensity control which utilizes a variable speed drive and which gives rise to the resolution of a number of problems including:

1. Determining the speed at which the main drive should rotate in relationship to net energy applied to the refiner;
2. Determining no load horsepower on a real time basis and using such data for optimization of the total refiner energy requirements;
3. Determining the actual net energy being applied to the refiner; and
4. Determining speed of the adjusting mechanism required which would be inversely proportional to the energy level of the main drive, there allowing an infinitely-adjustable speed range for control stabilization.

More specifically, the object is achieved through the resolution of the aforementioned problems through the solution of a plurality of unique algorithms whose values are derived from real time process measurements and adjustable constants which result in a calculated main drive speed that is related to the net energy drawn by the main drive.

The accuracy of the control is therefore dependent on the precise determination of no load horsepower. Therefore, a unique linear equation is used to determine the no load horsepower. A two-dimensional array which represents the "fingerprint" of the process in real time is established, this fingerprint taking into consideration the no load power at various speeds for a given tonnage rate, plus other mechanical and hydraulic losses.

The accuracy of the result is further improved and made adaptive by solving the entire no load horsepower equation using a real time measurement of flow and consistency.

The actual net horsepower days per ton can now be calculated using the calculated no load horsepower and an actual power measurement from the drive motor.

The result of the aforementioned series of calculations is employed as feedback to indicate the imbalance between set point horsepower day per ton and actual horsepower day per ton. A balanced condition is accomplished by adjusting the refining elements.

At the same time that the net energy is being adjusted, the equation for required speed is being processed. The required speed is a function of the inch cuts per revolution of the bars of a refining plate and is constant for each refiner plate configuration, net horsepower which is the result of a previously-explained calculation and an intensity factor which is a numerical constant representing the physical fibre development desired.

The result of the just-mentioned calculation is the required speed of the drive motor for any varying set of conditions.

In order to ensure that the calculated results are accurately implemented by the final control element, i.e. refiner gearmotor, a variable speed adjusting device is employed. The actual gearmotor speed is an inverse function of power drawn by the main drive, and an adjustable constant which results in slower rotational speed of the adjusting device as the applied power increases. This unique feature eliminates a common cause of control instability which results when drive motors are operated at or near their full load ratings and refiner elements are adjusted at some predetermined constant speed.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

General

In general terms, the present invention provides the method for maintaining refining intensity constant under varying tonnage rates and applied power conditions, to a slurry of paper stock being passed through a disk refiner. This is accomplished through the use of a control strategy and several unique control algorithms which combine to provide a result which relates the speed of rotation of the refiner elements to the power being drawn by the main drive. Intensity is defined as the net refining power applied divided by the number of bar crossings (refiner elements) per unit time (IC/-REV). Net refining power is defined as the gross horsepower of the main drive minus the no load horsepower. The no load horsepower is a summation of power required to rotate the refiner elements against the resistance due to forces exerted by the paper slurry between the refiner elements plus gland frictions, bearing frictions, windage, and internal turbulence plus other minor factors which are not completely defined. The present invention provides a technique by which a process setpoint is established, refiner power required is calculated, refiner elements are adjusted at a variable rate which is dependent on the magnitude of the applied power, actual net horsepower is determined using the aforementioned unique fingerprint method for the no load determination, and a rotational speed of the main drive is calculated to maintain refining intensity constant for varying process conditions.

Figure 1A:
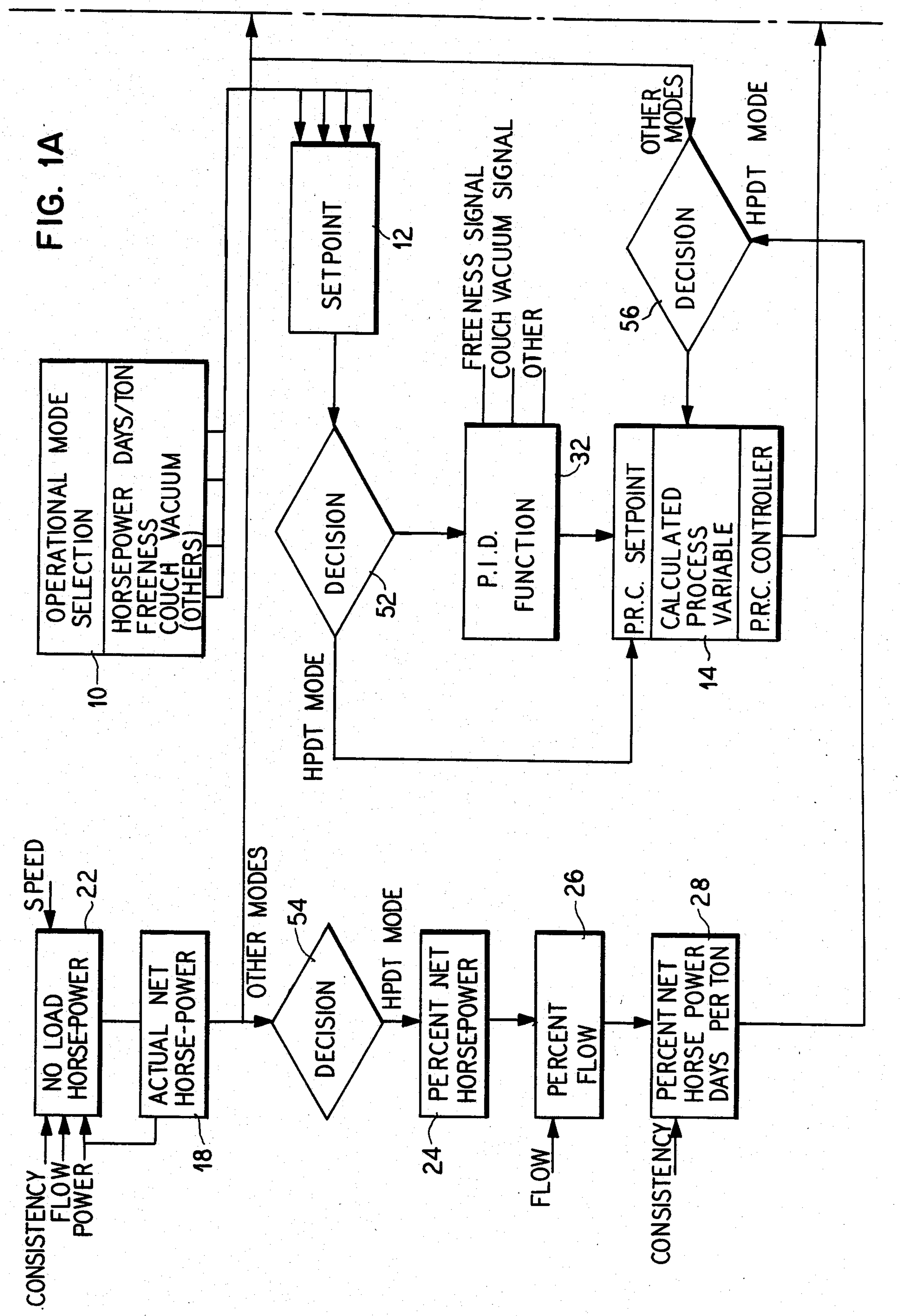
FIG. 1A and FIG. 1B together provide a schematic representation of an adaptive constant refiner intensity control, constructed in accordance with the present invention, connected to and controlling a refiner on the basis of real time process measurements.
Figure 1B:
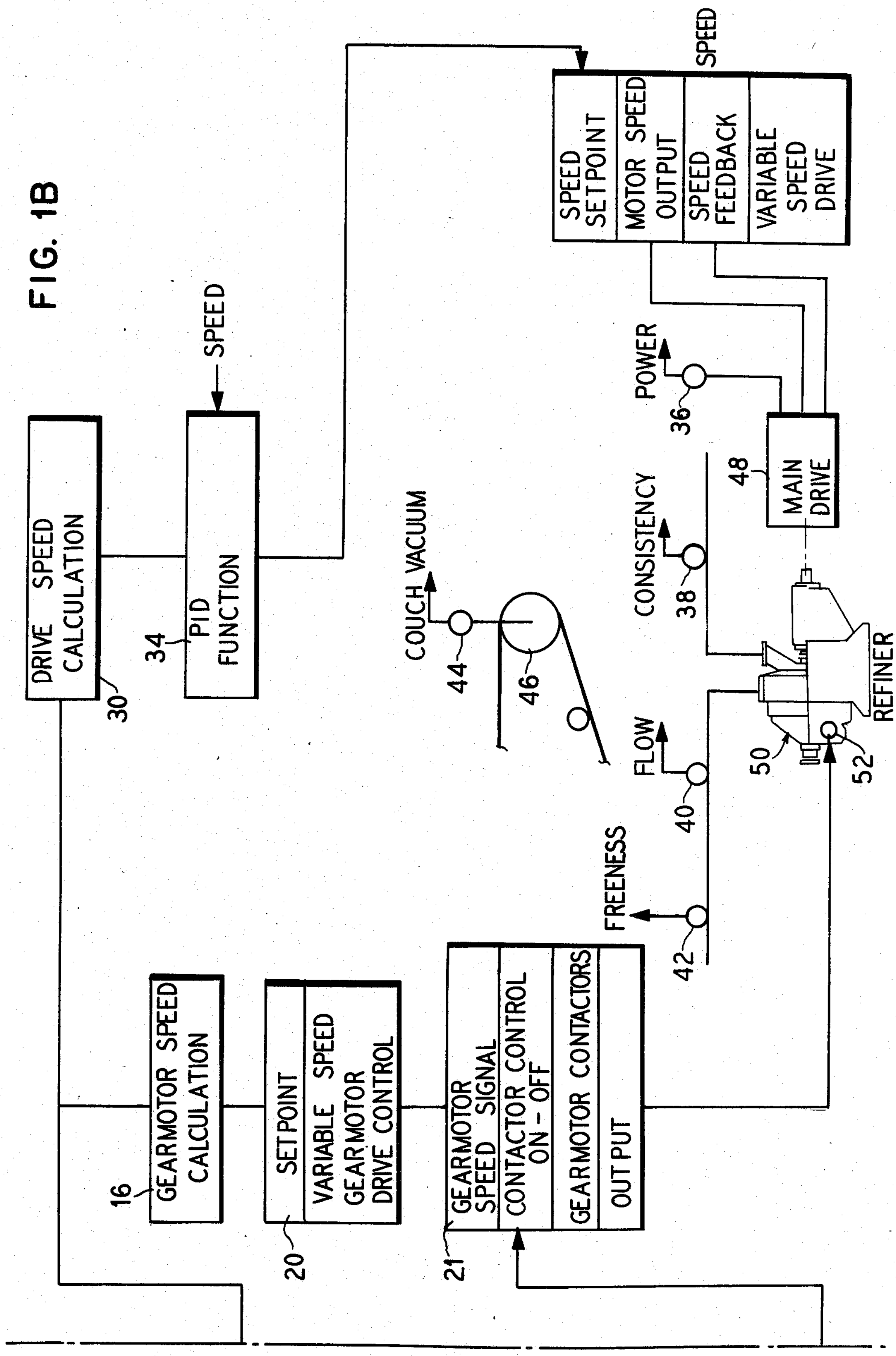

Referring to FIG. 1A and FIG. 1B, the elements of the adaptive constant refiner intensity control will be separately explained.

Mode Selection

Generally indicated at 10 is the mode selection element which provides a means, through operator-selected methods of control, (i.e. freeness control, couch vacuum control, horsepower days per ton control or others) to indicate in which mode of operation the control system is to function. A menu type format is employed, and once the mode of operation is selected, proper scaling and range numbers of transmitters are assigned to the setpoint portion of the system by associated software subroutines.

Process Setpoint

The process setpoint element 12 represents a means of establishing the level of desired refining results.

When the horsepower day per ton (HPDT) mode of operation is selected, the proportional, integral, derivative function is not required and is bypassed, thus permitting the required HPDT setpoint to be received directly by the programmable refiner controller (PRC) 14.

Programmable Refiner Controller

The programmable refiner controller 14 receives as its input, representative of a required power setpoint, the output of the process setpoint element 12. Depending on the mode of operation selected, as will be described below under the subheading Mode Selection, the feedback signal will be either calculated net horsepower days per ton or actual net horsepower.

The PRC element 14, based on deviation of the feedback signal from the setpoint signal, initiates the corrective action required by the disk positioning device, i.e. increases or decreases relative refiner elements position, until a balanced condition exists. The rate of speed with which the repositioning of the refining elements is accomplished will be determined by the calculated gearmotor speed element 16.

Calculated Gearmotor Speed Element

The calculated gearmotor speed element 16 receives the actual net horsepower signal from the actual net horsepower element 18, and through the processing of a unique linear equation, determines the speed at which the plate adjusting gear motor is to rotate. The calculated gearmotor speed equation inverts the speed of the gearometer such that increase in main drive power results in a decrease in rotational speed of the gearmotor adjusting mechanism. This actual method is described in a separate application, Ser. No. 660,522, filed Oct. 12, 1984, fully incorporated herein by this reference.

Refiner Plate Adjustment Element

The refiner plate adjustment is accomplished using a standard motor starter and reversing contactor combination 18. The direction of rotation and the on-time duration is determined by the required refiner power element 20, while the speed of the gearmotor is predetermined and self-adjusting through the calculated gearmotor speed element 16.

No Load Horsepower

The no load horsepower element 22 represents a unique method of developing an accurate no load value which is, under most conditions, a variable whose value changes with the percent load of the main drive motor. The term no load horsepower is defined above under the subheading "General". For an accurate determination of net horsepower, this value must be accurate over the entire load range of the main drive motor. The determination of this value is accomplished by a technique called fingerprinting, which places in an array, the total no load values of the main drive motor at various incremental speeds. The matrix becomes the true indication of no load horsepower for the machine under control and takes into account all of the various losses defined andundefined that exists for the particular machine.

The matrix contains two fields which record the speed at a particular instant and the corresponding no load power value at the same instant.

This information, in conjunction with the actual speed measurements of the variable speed drive system, and combined with a measurement signal proportional to stock consistency and stock flow rate, provide the no load horsepower value. The use of a measurement of actual stock consistency and stock flow rate are necessary in order to provide a representation of the change in consistency or flow rate effect on the actual no load horsepower.

The entire process of determining the no load horsepower is represented by the following relationship $$NHL = A + \left\{ \frac{\left[\frac{(CA - CT)}{K_C}\right] + \frac{(FA - FT)}{K_F}}{2} \right\}$$

$K_C$ is the adjustable horsepower constant to trim change in consistency effect on no load horsepower;

CA is the actual consistency;

CT is the setpoint or target consistency;

$K_F$ is the adjustable constant to trim change in flow effect on no load horsepower;

FA is the actual flow;

FT is the setpoint for target flow;

A is the matrix value power selected by the value of the actual measured variable RPM; and RPM is the measured variable of speed.

TABLE IV

| SPEED NO LOAD HORSEPOWER ARRAY | | |
|---|---|---|
| DATA POINT | RPM | A |
| 1 | 900.0 | 180.0 |
| 2 | 899.5 | 179.8 |
| 3 | 899.0 | 179.4 |
| 4 | 898.5 | 179.2 |
| 5 | 898.0 | 179.0 |
| 6 | 897.5 | 178.8 |
| 7 | 897.0 | 178.6 |
| 8 | 896.5 | 178.4 |
| 9 | 896.0 | 178.2 |
| 10 | 895.5 | 177.8 |
| 11 | 895.0 | 177.4 |
| 12 | 894.5 | 177.2 |
| 13 | 894.0 | 176.7 |
| 99 | 401.0 | 131.0 |
| 100 | 400.0 | 130.0 |

Actual Net Horsepower

The actual net horsepower being consumed by the main drive motor is determined by the relationship $$\text{ACTUAL NET HORSEPOWER} = \frac{\text{ACTUAL POWER}}{.746} - \text{NO LOAD POWER}$$

The actual net horsepower calculated is used as feedback information to the gearmotor speed calculation, the intensity calculation, the PRC element and the % net horsepower element.

Net Horsepower

The % net horsepower element 24 determines the of net horsepower being consumed by the main drive motor. Its value is derived from the relationship $$\%\ \text{NET HORSEPOWER} = 100\left(\frac{\text{ACTUAL NET HORSEPOWER}}{K_3}\right)$$

Actual net horsepower is derived from the foregoing relationship and the constant $K_3$ is an adjustable constant which is representative of available net horsepower.

% Flow

The % flow element 26 determines the actual flow rate at a given instant in time and converts this value into a percentage of maximum flow. Its value is derived from the relationship $$\%\ \text{Flow} = 100\left(\frac{\text{ACTUAL FLOW}}{K_4}\right)$$

The actual flow value is derived by utilization of a standard flow (mass) measuring device such as a magnetic flow transmitter.

In the above equation, $K_4$ is an adjustable constant which is representative of the calibrated range of the flow measuring device.

% Net Horsepower Days Per Ton

The % net horsepower days per ton element 28 calculates the actual net horsepower days per ton being applied by the main drive motor, based on the flow rate (T/D) and consistency of the material being processed at any given instant in time. The % net horsepower days per ton is derived from the following relationship $$\%\ NHDT = \left(\frac{\%\ \text{NET HP}}{[(C \times P_1) + P_2]}\right)(\%\ \text{FLOW} \times 0.06)$$

C is the value of measured consistency;

$P_1$ is $(1-P_2)/50$;

$P_2$ is the minimum consistency/mean consistency;

% flow is the result of the calculation of the percent flow; and 0.06 is 1/16.62.

The use of the above equation contained in the % net horsepower days per ton is not specifically claimed as the present invention. This procedure has been defined and claimed by Mr. Gary Flohr in his U.S. patent application Ser. No. 370,577, filed Apr. 19, 1982, allowed Aug. 28, 1984, and fully incorporated herein by this reference.

Intensity Calculation

The result of the intensity calculation by the element 30 is a signal which represents the speed of rotation of the main drive motor which maintains the relationship in equality. The required speed of rotation of the main drive motor is determined by the relationship $$\text{RPM (Speed)} = \frac{\text{ACTUAL NET HORSEPOWER}}{IC/REV \times \text{INTENSITY FACTOR}}$$

where:

NET HORSEPOWER is the result of the actual net horsepower calculation;

IC/REV is the adjustable constant which is dependent on the configuration of the refining element design; and $$\text{INTENSITY FACTOR} = \frac{\text{ACTUAL NET HORSEPOWER}}{IC/REV \times \text{RPM}}.$$

The intensity factor being an adjustable constant which is representative of the result required after material is passed through the disk refiner and the refining elements.

Proportional, Integral, Derivative (PID)

It is not intended to claim herein, in any manner except in combination with the other elements of the invention, the standard PID functioning which has been known to those skilled in the art for many years. These standard functions are employed within the concept of the present invention to improve the overall operation. They are included, with definition of each, to more readily allow understanding of the present invention and are represented by the element 32.

The term "proportional" or "gain" is the ratio of the change in output to the change in input due to proportional control action.

The term "integral" is the control action where the rate of change of output is proportional to the input.

The term "derivative" is the ratio of maximum gain resulting from proportional plus derivative control action to the gain due to proportional action alone.

The above three control functions are finitely adjustable with certain limits and represent a means of process tuning the operating control scheme.

A similar circuit 34 is provided for controlling the main drive speed setpoint from the speed calculation of the element 30.

HARDWARE

Control Circuits

The individual control circuits or elements set forth above may be provided from a plurality of different circuits; however, it has been determined that the calculations can be readily handled by a computer, namely a DEC (Digital Equipment Corporation) Mod PDP 11-23E computer. The PDP 11-23E system comprises a 1 Meg Disk Drive, A/D (Analog-to-Digital) input cards, D/A (Digital-to-Analog) output cards, an RSX operating system, and a Pascal (UCSD) version compiler.

Main Motor Drive Package 36

The main motor variable frequency drive package selected is a 600 HP variable frequency controller supplied by Reliance Electric.

Gear Motor Drive Package 20

The gearmotor variable frequency drive package selected was a 5 HP variable frequency controller supplied by Emerson Electric Co., Model AS270-OTB.

Gear Motor Adjustment Panel 18

The gearmotor adjustment panel is manufactured by and available from Beloit Corporation per their drawing D42-400788.

PRC 14

The programmable refiner controller is manufactured by and available from Beloit Corporation per their drawing D42-400983-Gl.

Power Signal Transmitter 36

The power signal transmitter selected is manufactured by Scientific Columbus, Mod XL.

Consistency Transmitter 38

The consistency transmitter is manufactured by the Dezurik Corporation, Mod 710BC.

Flow Transmitter 40

The flow transmitter 40 is manufactured by the Foxboro Company, Mod 2800.

Freeness Transmitter 42

The freeness transmitter selected is the Mod Mark III manufactured by Bolton Emerson Company of Lawrence, MA.

Couch Vacuum Transmitter 44

The couch vacuum transmitter 44 selected, which senses the vacuum on the couch roll 46, is manufactured by the Foxoboro Company of Foxoboro, MA.

The decision elements 52, 54 and 56 are, of course, portions of the PDP 11-23E system.

The other operating elements, of course, are the main drive motor 48 and the refiner 50 which includes the refiner gearmotor 52.

Modes of Operation

As indicated above, a PDP 11-23E computer was selected to implement the adaptive constant refiner intensity control technique. As also set forth above, the PDP 11-23E is not the exclusive means of implementation. The control technique outlined in detail can be implemented using analog techniques or digital techniques with properly selected hardware by those of ordinary skill in the art of instrumentation application.

The operation described below is based on digital implementation and will be described in small blocks or initial understanding. The last portion will tie all of the various operational blocks together to represent the complete operating technique. FIGS. 1 and 1A therefore represent both the hardware of the system and a flow chart detailing the operational modes of the system.

Mode Selection, Setpoint, Decision

The mode selection portion of the control system is implemented using a cathode ray tube (CRT) terminal interconnected to the computer, this terminal being represented at 10. The software modules present the operator with an interactive dialog routine requiring input from the keyboard (also a part of the element 10) to establish the mode in which the control system is to operate, i.e. HPDT mode, couch vacuum mode, freeness control mode, and others.

The selection mode, the setpoint and the decision portion of the control technique is represented in FIG. 1 by the elements 10, 12 and 52.

Using the interactive data received during an initial control setup, the following menu and dialog take place during which proper subroutines are selected which determine the correct scaling data and constants required for the selected mode of operation. At the same time, the various decisions are set based on the same input data.

GRADE INPUT MENU

GRADE DESCRIPTIONS 1
2
3
4
Select One?

CONTROL MODE SELECTION

1. Select Refiner?
2. Do you wish to run in HPDT mode Y/N?
3. Do you wish to run in freeness mode Y/N?
4. Do you wish to run in couch vacuum mode Y/N?
5. Do you wish to run in "other" mode Y/N?
   You have selected _____ mode for refiner No. _____
   Is your selection correct? Y/N?

BEGIN INTERACTIVE DIALOGUE

1. You have selected (grade) _____
   Is you selection correct? Y/N
2. Do you wish to initiate Automatic Control? Y/N
3. Y = "Automatic Control Initiated" Subroutine A
4. N = Transfer to subroutine for constant readjustment Subroutine "B"

No Load Horsepower and Actual Net Horsepower

The no load horsepower element 22 and the actual net horsepower 18 are implemented, along with the decision element 54 using a speed, power data array established from real time data acquisition techniques, and the continuous solution of the no load horsepower equation set forth above for the no load horsepower element 22 and the actual net horsepower element 18.

Referring to these elements and to the equations therefore, the speed, power data matrix, hereinafter referred to as the fingerprint, establishes a no load characteristic curve of no load values for the individual motor and refiner involved over the entire speed range of the variable speed main drive motor 48. This curve, developed in this manner, takes into account all power losses due to various circumstances described under GENERAL above and represents the true no load values at various speed levels of the drive.

The following schedule represents a typical pseudo-code for completing the fingerprinting operation. This fingerprinting operation need be done only once prior to initiating automatic control. The fingerprinting process is repeated only if mechanical changes are made, i.e. larger horsepower motor or different refiner element configurations.

PSEUDO CODE

1. Start Main Drive and Accel Drive to Max. Speed, Start Stock Pump.
2. Check Inlet Pressure and Consistency are within range.
3. Decel Drive Increments.
4. Read Drive Power and Speed at each Increment $P_{(1)}S_{(2)}$, etc.
5. Upon completion transfer control to grade input menu.

It should become apparent to those skilled in the art that the number of data points established in the speed, power data array, impacts greatly on the accuracy of the curve developed. A typical fingerprinting data array is illustrated in the Description of the No Load Horsepower Element set forth below, and will be used throughout the balance of this text to illustrate actual operation of the control process. The algorithms described in equation form have not in all cases been simplified in order to provide a more thorough understanding of the concept.

The no load horsepower element 22 operates as follows.

1. The value of the speed input is assigned to the program variable AIN.
2. Using standard array search techniques, the value in the variable A is compared to the motor speed values placed in the array during the fingerprinting procedure.
3. The closest possible match to the value contained in the program variable AIN is found, the corresponding value of the power at that point is assigned to the program variable AOUT.
4. The no load horsepower equation is solved and a calculated value is assigned to the program variable NLHP.

The following illustrates, numerically, the procedure described above.

$$NLHP = AOUT + \left\{ \frac{\left[\frac{(CA - CT)}{K_C}\right] + \frac{(FA - FT)}{K_F}}{2} \right\}$$

where:

CA = Actual Consistency from the consistency transmitter 38;

CT = Setpoint Consistency;

FA = Flow Actual from the flow transmitter 40;

FT = Setpoint Flow;

$K_C$ = Adjustable constant to represent change in consistency effect on the corrected no load value for different types of material being processed;

$K_F$ = Adjustable constant to represent change in flow effect for different types of material; and AOUT = Array value stored in the array at the location indicated by the match of the AIM variable to the array speed (RPM) value.

| NLHP - DATA ARRAY | | |
|---|---|---|
| AIN | RPM | AOUT |
| 898.5 | 900 | 180.0 |
| | 899.5 | 179.8 |
| | 899.0 | 179.4 |
| | 898.5 | 179.2 |
| | 898.0 | 179.0 |
| | 897.5 | 178.8 |
| | 897.0 | 178.6 |
| | 896.5 | 178.4 |
| | 896.0 | 178.2 |
| | 895.5 | 177.8 |
| | 895.0 | 177.4 |
| | 894.5 | 177.2 |
| | 894.0 | 176.7 |

| CALCULATION RESULT | | | | | | | | |
|---|---|---|---|---|---|---|---|---|
| AIN | AOUT | CA | CT | FA | FT | KC | KF | NLHP |
| 898.5 | 179.2 | 3.5 | 3.5 | 1000 | 1000 | .1 | 30 | 179.2 |
| 898.5 | 179.2 | 4.0 | 3.5 | 1000 | 1000 | .1 | 30 | 181.7 |
| 898.5 | 179.2 | 3.0 | 3.5 | 1000 | 1000 | .1 | 30 | 176.7 |
| 898.5 | 179.2 | 3.5 | 3.5 | 1200 | 1000 | .1 | 30 | 182.5 |
| 898.5 | 179.2 | 3.5 | 3.5 | 900 | 1000 | .1 | 30 | 177.5 |
| 898.5 | 179.2 | 3.2 | 3.5 | 1100 | 1000 | .1 | 30 | 179.5 |

$K_C = .1$
$K_F = 2$

The above calculation results indicate that the equation stated can produce a result, which can be described as adaptive in nature, when consistency and flow values are active inputs to the equation. It also describes the procedure for obtaining accurate no load horsepower values which are an integral and important portion of the entire control technique. The two constants $K_C$ and $K_F$ are empirical and must be derived from actual trials.

ACTUAL NET HORSEPOWER

The value of the actual net horsepower is determined from the following equation.

$$ANHP = \left(\frac{\text{Power}}{.746}\right) - NLHP$$

where:

ANHP = Actual Net Horsepower;

POWER = Actual Kilowatt value obtained from the watt measuring device (power transmitter 36);

0.746 = Conversion Factor derived from established definition used to convert KW to HP,
1 HP = 33,000 ft-lb/min,
1 HP = 550 ft-lb/sec.,
1 HP = 746 Watts, and
1 HP = 0.746 Kilowatts; and NLHP = Result of solution to NLHP above.

Using the above equation for actual net horsepower, the following illustrates, numerically, the use of the calculation results from the no load horsepower calculation, assuming the motor horsepower to be 1000 HP.

| POWER IN KW | HORSEPOWER | NLHP | ANHP |
|---|---|---|---|
| 745 KW | 998.6 | 179.2 | 819.4 |
| 600 KW | 804.2 | 181.7 | 622.5 |
| 500 KW | 670.2 | 176.7 | 493.5 |

The above calculation results indicate that the equation, as stated, produces an actual net horsepower days per ton value which is based on a killowatt to horsepower conversion, less the result of the no load horsepower calculation.

Percent Net Horsepower, Percent Flow, Percent Net Horsepower Days Per Ton

The percent net horsepower, percent flow and percent net horsepower days per ton are provided for the horsepower days per ton mode by the elements 24, 26 and 28 of FIG. 1 with the additional inputs from the flow transmitter 40 and the consistency transmitter 38 and are implemented, as indicated, only when a HPDT mode of operation is selected. The conversion of values to percent is not per se unique, but a feature of the invention.

Percent Net Horsepower Days Per Ton

The percent net horsepower days per ton element 28 represents a standard modification to a procedure disclosed in U.S. Pat. No. 4,184,204, granted Jan. 15, 1980 to Gary Flohr, assigned to the same assignee as the present invention and fully incorporated herein by this reference.

The object of this element is to convert incoming process measurement signals into a net horsepower days per ton value using a unique method disclosed in U.S. Pat. No. 4,184,204. The modification of this procedure is the percent conversion of the resultant values which is required for operation of the present invention, and the fact that the variable percent net horsepower is now presented to this element for resolution of its equation in a form derived from the above description of the percent net horsepower days per ton utilizing the percent net horsepower, the percent flow and the consistency measurements and ratios.

Percent Net Horsepower

The percent net horsepower element 24 provides a straight forward conversion of a value determined by the elements 22 and 18 to a percent value. In the numerical examples set forth below for the percent net horsepower equation, the constant K3 is adjustable and is representative of available net horsepower. Available net horsepower can be described as the maximum rated horsepower of the main drive motor 48 minus its no load horsepower and assuming the motor horsepower to be 1000 HP and its no load horsepower to be 180 HP, the constant K3 is equal to 820 HP. If an actual net horsepower is assumed to be 600 HP, then % Net HP = Actual Net Horsepower/K3

% Net HP = 100 (600/820)

% Net HP = 73.1%.

Percent Flow

The percent flow element 26 provides a conversion procedure which utilizes the flow measurement received from the flow transmitter 40 and an adjustable constant K4 to produce a value representative of percent flow. The constant K4 represents the calibrated range of the flow measuring device. Actual flow is the value of the output of the flow measuring device at any specific moment in time. If one assumes a flow measuring device calibration range of 1000 GPM and an actual flow measurement of 800 GPM, then % Flow = 100 (800/1000)

% Flow = 80%.

Gearmotor Speed, Variable Speed Drive and Gearmotor Plate Adjustment

These functions are represented by the elements 16, 20 and 21 in FIG. 1. They are also disclosed in my earlier application Ser. No. 660,522, filed Oct. 12, 1984 and fully incorporated herein by this reference. These techniques have been incorporated in the present control process to enhance its overall operation and are provided separately below with numerical examples.

Gearmotor Speed

This section of the control is based on the continuous solution of a linear equation using various methods of performing calculations required with the result that represents required gearmotor speed. The heart of this technique is the concept of varying the output speed of the gearmotor in an opposite relationship to the magnitude of the refiner main drive power and the basic linear equation is:

$$GMSR = GMSMX - [(ACMMP/AVMMP)/GMSMX] + GMSMN$$

where:

- GMSR = Gearmotor Speed Required;
- GMSMX = Maximum Gearmotor Speed (An adjustable constant with represents the maximum RPM output of the gearmotor);
- ACMMP = Actual Mainmotor Power (A real time measurement of the power being drawn by the main drive of the refiner);
- AVMMP = Available Main Motor Power (An adjustable constant which represents the maximum horsepower in killowatts that a refiner drive can deliver);
- GMSMN = Minimum Gearmotor Speed (An adjustable constant contained in a variable frequency drive controller).

TYPICAL EXAMPLE

Assume Main Drive Horsepower = 200

- Max.Availble Power = 200 HP × 0.746 = 149.2 Kilowatt
- Max.Gearmotor Speed = 900 RPM
- Min.Gearmotor Speed = 50 RPM
- Range of Gearmotor Speed = 900 RPM − 50 RPM = 850 RPM
- Set Max.Speed At = 850 RPM
- Assume No load HP = 70 HP × 0.746 = 52.2 Killowatt.

| Main Motor Power (Actual) | Main Motor Power (Avail.) | Max. GM Speed | Min. GM Speed | Gearmotor Speed |
|---|---|---|---|---|
| 149.2 KW | 149.2 KW | 850 RPM | 50 RPM | 50 RPM |
| 139.2 KW | 149.2 KW | 850 RPM | 50 RPM | 106 RPM |
| 129.2 KW | 149.2 KW | 850 RPM | 50 RPM | 163.8 RPM |

-continued

| Main Motor Power (Actual) | Main Motor Power (Avail.) | Max. GM Speed | Min. GM Speed | Gearmotor Speed |
|---|---|---|---|---|
| 119.2 KW | 149.2 KW | 850 RPM | 50 RPM | 220 RPM |

The foregoing demonstrates that as the actual measured main motor power varies, the output speed of the gearmotor varies in opposition thereto.

Variable Speed Drive

The variable speed drive 20 represents a standard variable frequency drive controller. There are several manufacturers of this type of drive controller. The measure requirements of the variable speed drive controller are:

A. Must be capable of receiving the remote control signal derived from the Gearmotor Speed Calculation; and B. The variable speed drive controller must be sized to accommodate the power requirements of the various horsepower rated gearmotors.

As pointed out above, the gearmotor variable frequency drive package selected was a 5 HP VF controller supplied by Emerson Electric Co., their Model AS270-0TB.

Gearmotor Plate Adjustment

The gearmotor plate adjustment element 21 represents a group of motor starters and reversing contactors that receive their operational instructions from the programmable refiner controller 14.

As pointed out above, the gearmotor plate adjustment panel is manufactured by and available from Beloit Corporation per their drawing D42-400788 and is typical of gearmotor plate adjustment elements which may be utilized in practicing the present invention.

Programmable Refiner Controller

As pointed out above, the microprocessor-based programmable refiner controller is manufactured by and is available from Beloit Corporation per their drawing D42-400983-GL. Briefly, its operations consist of accepting an input signal from a remote source, comparing this signal to a measurement signal from the controlled device and implementing corrective action to a disk position device by means of speed and direction of rotation signals. It is also typical of a controller which may be employed in practicing te present invention.

Intensity Calculation

The drive speed calculation illustrated below represents a unique method for determining the required rotational speed of the main drive motor 48 connected to the disc refiner 50 to maintain a constant refining intensity for varying process conditions.

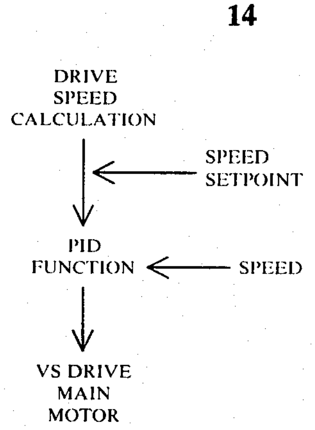

Intensity was previously defined in the general description as the net refining power applied divided by the number of bar crossings (refining elements) per unit The speed required is the result of continuous solving of the following unique equation.

$$\text{RPM (Speed)} = \frac{\text{ACTUAL NET HORSEPOWER}}{IC/REV \times \text{INTENSITY FACTOR}}$$

where:

Actual Net Horsepower is the mathematical result derived from the solution of the Actual Net Horsepower equation described above; and IC/REV is the inch cuts per revolution (the summation of the number of bars on a refining element in the rotor position times the number of bars in the stator position times the lengthcf the bars in each zone of the refining element, the summation being multiplied by the revolutions per minute).

Figure 2:
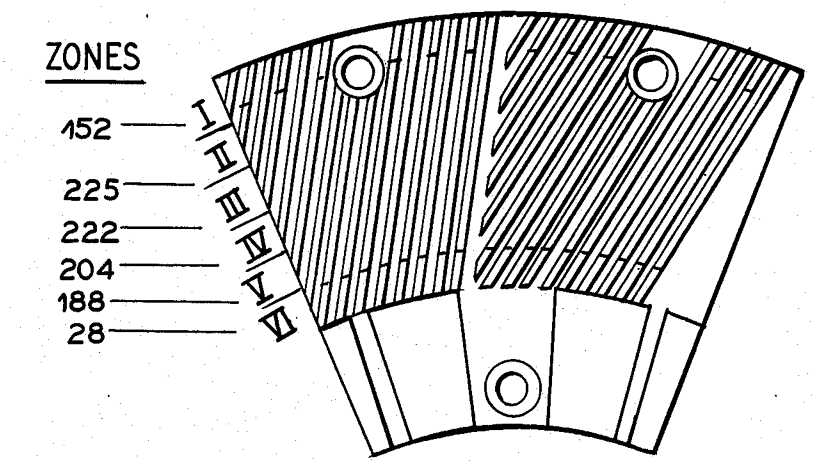
FIG. 2 is a plan view of a portion of a refiner plate of a refiner.

Referring to FIG. 2, the following applies:

$$IC/M = 2[(B_{R1} \times B_{S1} \times L_{I}) + (B_{R11} \times B_{S11} \times L_{11}) + (\text{-} B_{RN} \times B_{SN} \times L_{N})] \times RMP$$

where:

$B_{RI}$=Number of Bars in Rotor, Zone 1;

$B_{SI}$=Number of Bars on Stator, Zone 1;

$L_{I}$=length of Bar, Zone 1; and

RPM=Revolutions per Minute.

| ZONE | CALCULATION EXAMPLE $B_S$ | × $B_R$ | = $B_SB_R$ |
|---|---|---|---|
| I | 152 | 208 | 31,616 |
| II | 225 | 208 | 46,800 |
| III | 222 | 208 | 46,176 |
| IV | 204 | 192 | 39,168 |
| V | 188 | 176 | 33,088 |
| VI | 28 | 40 | 1,120 |
| | | | 197,968 |

197,968 × 2 = 395,936 IC/REV

The intensity factor is an adjustable constant empirical in nature used to describe the desired results from the refining process. This factor can be described by the relationship $$\text{INTENSITY FACTOR} = \frac{\text{ACTUAL NET HORSEPOWER}}{IC/REV \times \text{RPM}}.$$

Using the same values for horsepower and RPM which were previously used, the following will develop an intensity factor that will be used for the remainder of this description. Assuming the motor horsepower of 1000 HP and the actual net horsepower of 819.4 HP and a speed of 900 RPM for the main drive motor 48, the intensity factor IF is $IF = 819.4/(95936 \times 900)$ $IF = 23^{-5}$.

As stated above, this factor represents the combination of three variables, i.e. RPM IC/M which is refiner element dependent and speed of rotation which when combined together produce a desired end product.

With the establishment of an intensity factor, the drive speed calculation is $$\text{RPM (Speed)} = \frac{\text{ACTUAL NET HORSEPOWER}}{IC/REV \times \text{INTENSITY FACTOR}}$$

$$\text{RPM} = 819.4/(395936 \times 23^{-5})$$

$$\text{RPM} = 899.794.$$

The calculated speed now becomes the setpoint value to the PID function element 34. The calculated output from the PID element 34 is fed to the speed setpoint portion of the variable speed drive controller 36. A feedback signal is returned to the PID element 34 from the element 36 to ensure that the drive speed at the value determined by the output of the PID element 34.

Figure 3:
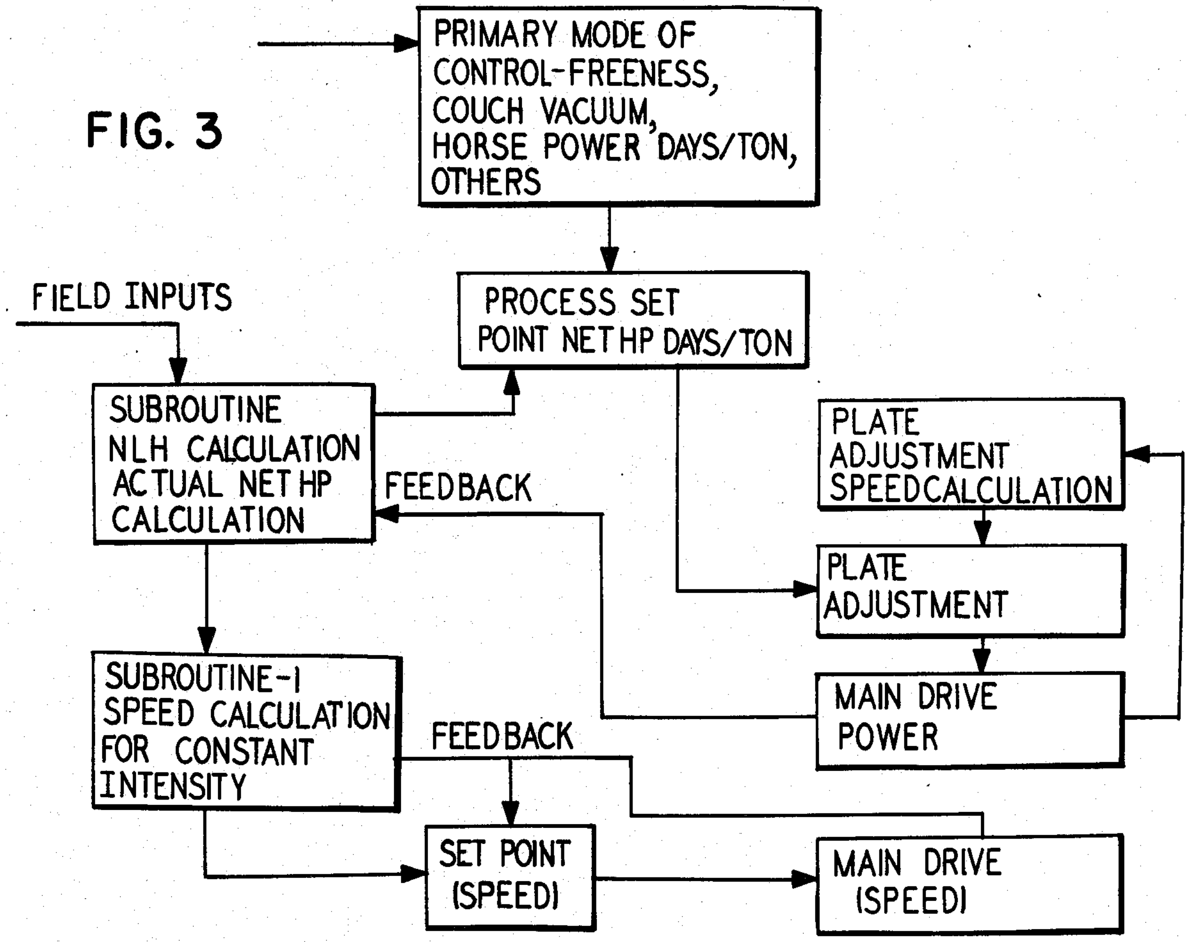
FIG. 3 is a simplified block diagram of the present invention.

Referring to FIG. 3, the control presented herein is comprised of a combination of physical measurement about the process, unique algorithms to determine various values, and control hardware to implement results needed to provide an adaptive constant intensity control of a disk type refining machine. FIG. 3 condenses the overall detailed descriptions of the invention into a simplified block (flow chart) version. The function of each block has been described previously. As is stated, the object of the invention is to provide a control system that will be adaptive in nature and maintain a constant refining intensity under varying process conditions while using one of several primary modes of control such as freeness control, horsepower days per ton control, couch vacuum control, and others.

As illustrated in FIG. 3, the basic steps involved are as follows:

A. The operator initiates the primary mode of control and establishes a setpoint value for the mode selected;

B. As the process measurement varies from setpoint, the refiner plate adjustment control repositions the refining element at a rate of speed determined by the plate adjustment speed calculation. The change in refining element position causes a change in main drive power.

C. The change in main drive power is recognized by the no load horsepower calculation and actual net horsepower calculation elements. The new no load horsepower value is inserted into the actual net horsepower calculation. The result is that the calculation becomes the process measurement signal and is fed back to the programmable refiner control to balance the control system at the setpoint value;

D. The newly-calculated actual net horsepower value is also fed to the speed calculation element for the speed calculation algorithm, and a new speed setpoint value is developed; and E. The main drive motor variable speed controller is instructed, by way of the output of the speed calculation element and the proportional, integral, derivitive function to readjust its speed. The new speed value is fed back to the speed calculation element and the PID function to ensure the equation for constant intensity is in equality.

Significance

The significance of the present invention is multifold and involves a plurality of means and methods for providing an adaptive control for maintaining constant refining intensity under varying tonnage rates and applied power conditions to a slurry of paper stock be passed through a disk type of refiner. These methods and means are:

1. Providing a method and means to accurately determine the no load horsepower values of the main drive motor as a first step in developing an accurate overall control technique for providing a uniform product from the disk type refiner;
2. Providing a means and method for controlling the intensity of the refining action, based on varying process measurements and product results required, is an additional benefit and feature which contributes to a uniform product output;
3. Providing a means and method for adjusting the main drive power speed of rotation based on solutions to unique equations contributes to the ability of the control technique to produce a uniform product at a main drive power consumption less than normally-associated with fixed speed drive motor; and
4. Any improvement in the controllability of the disk refiner variables, i.e. horsepower consumed in relative refining element positions, must result in an improved end product with less energy consumption for a given set of circumstances.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of controlling a paper making refiner which includes a gearmotor for adjusting refiner plates and which is driven by a main drive motor, comprising the steps of:

(a) sensing the stock consistency and stock flow rate of the flow rate signals;

(b) sensing the speed and power of the drive motor and producing corresponding speed and power signals;

(c) producing a no load horsepower signal of the drive motor in response to the consistency, flow rate and speed signals;

(d) converting the no load horsepower into percent horsepower days per ton in response to the power, flow rate and consistency signals, including the step (e) converting the no load horsepower into actual net horsepower in response to the power signal;

(f) producing a drive motor speed signal from the actual net horsepower, a first adjustable constant dependent on therefiner plate configuration and an intensity factor defined as a second adjustable constant representing a required refining result, and applying the drive motor speed signal to the drive motor; and (g) producing a gearmoror speed signal from the percent horsepower days per ton, a main drive speed setpoint, the main motor power, theavailable main motor power and the maximum and minimum gearmotor speed, and applying the gearmotor speed signal to the gearmotor.

2. The method of claim 1, wherein the step (a) and the step (b) are further defined as:

(a1) producing analog consistency and flow rate signals; and (b1) producing analog speed and power signals.

3. The method of claim 2, wherein the step (a) and the step (b) are further defined as:

(a2) converting the analog consistency and flow rate signals into digital consistency and flow rate signals; and (b2) converting the analog speed and power signals into digital speed and power signals.

4. The method of claim 1, wherein the step (c) is further defined as:

(c1) calculating the no load horsepower NLH in accordance with the relationship $$NLH = A + \left\{ \frac{\left[\frac{(CA - CT)}{K_C}\right] + \frac{(FA - FT)}{K_F}}{2} \right\}$$

where CA is the actual consistency, CT is a target consistency, FA is the actual flow rate, FT is a target flow rate, $K_C$ is a third adjustable constant to trim change in consistency on no load horsepower, $K_F$ is a fourth adjustable constant to trim the flow rate effect on no load horsepower, and A is a value representing drive motor power at the sensed drive motor speed.

5. The method of claim 1, wherein the step (d) is further defined as:

(d1) calculating the actual net horsepower ANHP in accordance with the relationship $$ANHP = \frac{\text{POWER}}{.746} - NLH$$

where POWER is the actual sensed drive motor power in kilowatts, 0.746 is a conversion factor to horsepower and NLH is the no load horsepower.

6. The method of claim 5, wherein the step (d) is further defined as:

(d2) calculating the percent net horsepower PNH in accordance with the relationship

PNH=100 (ANHP/K3)

where K3 is the maximum rated horsepower of the drive motor minus the no load horsepower.

7. The method of claim 6, wherein the step (d) is further defined as:

(d3) calculating the percent flow PF in accordance with the relationship

PF=100 (ACTUAL FLOW/K4)

where K4 is the calibrated range of a flow device.

8. The method of claim 7, wherein the step is further defined as:

(d4) calcualting the percent net horsepower days per ton PNHDT in accordance with the relationship $$PNHDT = \left( \frac{PNH}{(C \times P_1) + P_2} \right) (PF \times .06)$$

where PNH is the percent horsepower, C is the sensed consistency, $P_1$ is $(1-P_2)/50$, $P_2$ is the minimum consistency divided by the means consistency and PF is the percent flow.

9. The method of claim 1, wherein the step (f) is further defined as:

(f1) calcualting a speed RPM for the drive motor in accordance with the relationship $$\text{RPM} = \frac{ANHP}{IC/REV \times \text{INTENSITY FACTOR}}$$

where ANHP is the actual drive motor horsepower, IC/REV is the inch cuts per revolution of the refining plates, and the INTENSITY FACTOR is the second adjustable constant describing the desired refining results.

10. The method of claim 1, wherein the step (g) is further defined as:

(g1) calculating the gearmotor speed GMS in accordance with the relationship

GMSR=GMSMX−[(ACMMP/AVMMP)/GMSMX]+GMSMN where GMSR is the required gearmotor speed, GMSMX is the maximum speed of the gearmotor, GMSMN is the minimum speed of the gearmotor ACMMP is the actual main motor power and AVMMP is the available main motor power.

11. Apparatus for controlling a paper making refiner which includes a gearmotor for adjusting refiner plates and which is driven by a main drive motor, comprising:

means for sensing the stock consistency and stock flow rate of the refiner and producing corresponding consistency and flow rate signals;

means for sensing the speed and power of the drive motor and producing corresponding speed and power dignals;

means for producing a no load horsepower signal of the drive motor in response to the consistency, flow rate and speed signals;

means for converting the no load horsepower into persent horsepower days per ton in response to the power, flow rate and consistency signals, including means for converting the no load horsepower into actual net horsepower in resonse to the power signal;

means for producing a drive motor speed signal from the actual net horsepower, a first adjustable constant dependent on the refiner plate configuration and an intensity factor defined as a second adjustable constant representing a required refining result, and applying the drive motor speed signal to the drive motor; and means for producing a gearmotor speed signal from the percent horsepower days per ton, a main drive speed setpoint, the main motor power, the available main motor power and the maximum and minimum gearmotor speed, and applying the gearmotor speed signal to the gearmotor.

12. The apparatus of claim 11, wherein said means for sensing comprise:

means for producing analog consistency and flow rat signals; and means for producing analog speed and power signals.

13. The apparatus of claim 12, wherein said means for sensing comprise:

means for converting the analog consistency and flow rate signals into digital consistency and flow rate signals; and means for converting the analog speed and power signals into digital speed and power signals.

14. The apparatus of claim 11, wherein said means for producing comprises:

means for calculating the no load horsepower NLH in accordance with the relationship $$NLH = A + \left\{ \frac{\left[ \frac{(CA - CT)}{K_C} \right] + \frac{(FA - FT)}{K_F}}{2} \right\}$$

where CA is the actual consistency, CT is a target consistency, FA is the actual flow rate, FT is a target flow rate, $K_C$ is a third adjustable constant to trim the flow rate effect on no load horsepower, and A is a value representing drive motor power at sensed drive motor speed.

15. The apparatus of claim 11, wherein said means for converting no load horsepower comprises:

means for calculating the actual net horsepower ANHP in accordance with the relationship $$ANHP = \left( \frac{\text{POWER}}{.746} \right) - NLH$$

where POWER is the actual sensed drive motor power in kilowatts 0.746 is a conversion factor to horsepower and NLH is the no load horsepower.

16. The apparatus of claim 15, wherein said means for converting no load horsepower comprises:

means for calculating the percent net horsepower PNH in accordance with the relationship

PNH=100 (ANHP/K3)

where K3 is the maximum rated horsepower of the drive motor minus the no load horsepower.

17. The apparatus of claim 16, wherein said means for converting no load horsepower comprises:

means for calculating the percent flow PF in accordance with the relationship

PF=100 (ACTUAL FLOW/K4)

where K4 is the calibrated range of a flow device.

18. The apparatus of claim 17, wherein said means for converting no load horsepower comprises:

means for calculating the percent net horsepower days per ton PNHDT in accordance with the relationship $$PHNDT = \left( \frac{PNH}{(C \times P_1) + P_2} \right) (PF \times .06)$$

where PNH is the percent horsepower, C is the sensed consistency, $P_1$ is $(1-P_2)/50$, $P_2$ is the minimum consistency divided by the means consistency and PF is the percent flow.

19. The apparatus of claim 11, wherein said means for producing a drive motor motor speed signal comprises:

means for calculating a speed RPM for the drive motor in accordance with the relationship $$\text{RPM} = \frac{ANHP}{IC/REV \times \text{INTENSITY FACTOR}}$$

where ANHP is the actual drive motor horsepower, IC/REV is the inch cuts per revolution of the refining plates, and the INTENSITY FACTOR IS the second adjustable constant describing the sesired refining results.

20. The method of claim 11, wherein said means for producing a gear motor speed signal comprises:

means for calculating the gearmotor speed GMS in accordance with the relationship

GMSR=GMSMX−[(ACMM-P/AVMMP)/GMSMX]+GMSMN where GMSR is the required gearmotor speed, GMSMX is the maximum speed of the gearmotor, GMSMN is the minimum speed of the gearmotor ACMMP is the actual main motor power and VMMP is the available main motor power.

* * * * *